United States Patent
Bathe

(10) Patent No.: US 10,746,657 B2
(45) Date of Patent: Aug. 18, 2020

(54) METHOD FOR ACCELERATED HIGH-RESOLUTION SCANNING MICROSCOPY

(71) Applicant: Carl Zeiss Microscopy GmbH, Jena (DE)

(72) Inventor: Wolfgang Bathe, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 16/289,892

(22) Filed: Mar. 1, 2019

(65) Prior Publication Data

US 2019/0271648 A1    Sep. 5, 2019

(30) Foreign Application Priority Data

Mar. 1, 2018 (DE) .......................... 02018104693.6

(51) Int. Cl.
*G01N 21/69* (2006.01)
*G01N 21/64* (2006.01)
(Continued)

(52) U.S. Cl.
CPC ..... *G01N 21/6458* (2013.01); *G01N 21/6402* (2013.01); *G02B 21/008* (2013.01);
(Continued)

(58) Field of Classification Search
CPC .......... G01N 21/6458; G01N 21/6402; G01N 21/0032; G01N 21/0076; G01N 21/008;
(Continued)

(56) References Cited

U.S. PATENT DOCUMENTS

| | | | |
|---|---|---|---|
| 2002/0018199 A1* | 2/2002 | Blumenfeld | .......... G06T 1/0007 356/73 |
| 2003/0151735 A1* | 8/2003 | Blumenfeld | ....... G01N 21/6428 356/73 |

(Continued)

FOREIGN PATENT DOCUMENTS

| | | |
|---|---|---|
| DE | 102013015933 A1 | 3/2015 |
| DE | 102014111167 A1 | 2/2016 |

(Continued)

OTHER PUBLICATIONS

Müller, Claus B., et al., "Image Scanning Microscopy"; Physical Review Letters 2010; 104(19):198101-1-198101-4.

*Primary Examiner* — Kiho Kim
(74) *Attorney, Agent, or Firm* — Duane Morris LLP

(57) ABSTRACT

In a method for high-resolution scanning microscopy of a sample, provision is made of focusing of illumination radiation into an illumination spot in or on the sample and stimulating the emission of detection radiation at a sample spot that coincides with the illumination spot. The sample spot is imaged into an image that is static on a spatially resolving surface detector having pixels of a size that spatially resolve the image, wherein the imaging has a an optical imaging resolution limit. The entire sample is captured by performing a scanning movement of the illumination spot and of the coinciding sample spot over the sample in a scanning operation. An image of the sample having a resolution that is increased beyond the optical imaging resolution limit of the imaging is produced from the data of the pixels for each scanning position.

8 Claims, 5 Drawing Sheets

(51) Int. Cl.
*G02B 21/00* (2006.01)
*G06T 5/50* (2006.01)
*G06T 11/00* (2006.01)
*G06T 5/00* (2006.01)

(52) U.S. Cl.
CPC ..... *G02B 21/0032* (2013.01); *G02B 21/0076* (2013.01); *G06T 5/50* (2013.01); *G06T 11/005* (2013.01); *G01N 2201/12* (2013.01); *G06T 5/006* (2013.01); *G06T 2207/10056* (2013.01); *G06T 2207/10064* (2013.01); *G06T 2207/20016* (2013.01)

(58) Field of Classification Search
CPC ................... G01N 5/50; G01N 11/005; G01N 2207/20016; G01N 5/006; G01N 2207/11056; G01N 2207/10064; G01N 2207/20221
See application file for complete search history.

(56) References Cited

U.S. PATENT DOCUMENTS

| | | |
|---|---|---|
| 2011/0267688 A1 | 11/2011 | Kleppe et al. |
| 2014/0361154 A1 | 12/2014 | Hayashi |
| 2015/0077842 A1 | 3/2015 | Kleppe et al. |
| 2017/0102532 A1* | 4/2017 | Frankel ............ G02B 21/0084 |
| 2017/0227749 A1 | 8/2017 | Kleppe et al. |
| 2018/0024063 A1 | 1/2018 | Egner et al. |
| 2018/0031420 A1 | 2/2018 | Dyba |
| 2019/0310199 A1* | 10/2019 | Santori ................ G01J 3/0224 |

FOREIGN PATENT DOCUMENTS

| | | |
|---|---|---|
| DE | 102016110433 A1 | 12/2017 |
| EP | 2317362 A1 | 5/2011 |
| JP | 2006221190 A | 8/2006 |
| WO | 2016135178 A1 | 9/2016 |
| WO | 2016156541 A2 | 10/2016 |

\* cited by examiner

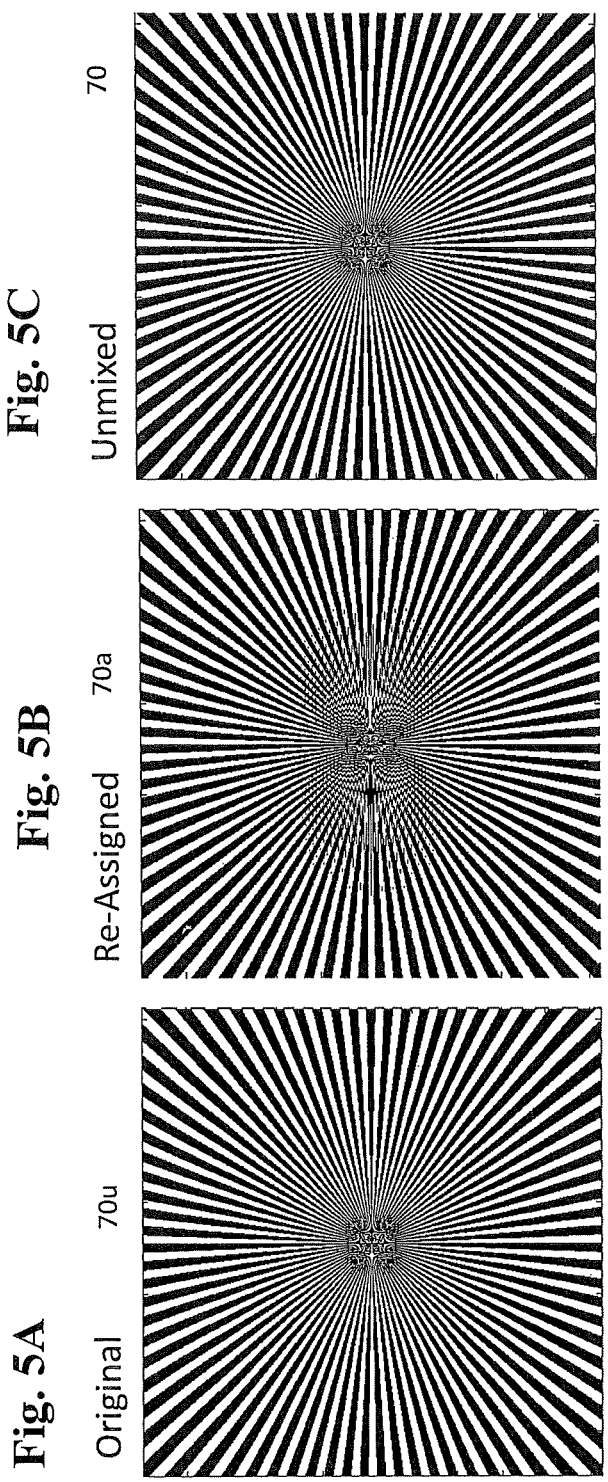
Fig. 5A Original 70u
Fig. 5B Re-Assigned 70a
Fig. 5C Unmixed 70

METHOD FOR ACCELERATED HIGH-RESOLUTION SCANNING MICROSCOPY

RELATED APPLICATIONS

The present application claims priority benefit of German Application No. DE 10 2018 104 693.6 filed on Mar. 1, 2018, the contents of which are incorporated by reference in its entirety.

FIELD OF THE INVENTION

The invention relates to a method for high-resolution scanning microscopy of a sample. Provision is made of focusing of illumination radiation into an illumination spot in or on the sample and stimulating the emission of detection radiation at a sample spot that coincides with the illumination spot. The sample spot is imaged into an image that is static on a spatially resolving surface detector comprising detector pixels of a size that spatially resolve the image, wherein the imaging has a resolution limit. The entire sample is captured by performing a scanning movement of the illumination spot and of the coinciding sample spot over the sample in a scanning operation. An image of the sample having a resolution that is increased beyond the resolution limit of the imaging is produced from the data of the pixels for each scanning position.

BACKGROUND OF THE INVENTION

A high-resolution microscopy method of this type is known from the publication C. Müller and J. Enderlein, Physical Review Letters, 104, 198101 (2010), or from EP 2317362 A1, which also includes further evidence relating to the prior art. It images the coinciding sample spot in a diffraction-limited fashion and scans the structure thereof. Such overscanning of the sample in combination with image reconstruction produces a high resolution (i.e., increased beyond the resolution limit of the optical imaging).

DE 10 2013 015 933 A1 aims to accelerate this method. In the section "Lateral speed-optimized illumination PSF," DE 10 2013 015 933 A1 describes an exemplary embodiment which aims to increase the image recording speed by way of scanning which is actually too coarse for overscanning. The image information that is missing due to the coarse scanning is to be reconstructed from the data of the detector pixels. However, the publication makes no reference at all as to how this reconstruction is to be performed. Possible reconstruction approaches such as spatially assigning the signals of the detector array into the target image result in disturbing artifacts.

The invention is based on the object of specifying an accelerated high-resolution microscopy method that avoids artifacts and in this way achieves better reconstruction of the image.

The invention is defined in the independent claims. The dependent claims relate to advantageous developments.

SUMMARY OF THE INVENTION

For high-resolution scanning microscopy of a sample, a plurality of steps are performed. Illumination radiation is focused to form an illumination spot in or on the sample. Hereby, the sample is stimulated to emit detection radiation at a sample spot that coincides with the illumination spot. The illumination spot and consequently also the sample spot are not diffraction-limited with respect to their size in at least one first spatial direction. Depending on the embodiment, they can be diffraction-limited or not diffraction-limited in the other spatial direction. The sample spot is imaged into an image. In embodiments, this imaging is performed in a diffraction-limited fashion. This is effected in a manner such that the image is static on a spatially resolving surface detector. The latter comprises pixels which are dimensioned such that the structure of the image is spatially resolved. The optical imaging, preferably performed in a diffraction-limited fashion, has a resolution limit. It furthermore has a point spread function, which spatially varies for the pixels. In a scanning process, the illumination spot and consequently the coinciding sample spot are moved over the sample in a scanning fashion. Lines of the scanning operation here extend along the first spatial direction. A distance between adjacent lines corresponds to the extent of the sample spot in the first spatial direction. During the scanning operation, the data of the pixel of the surface detector are read for each scanning position. An image of the sample having a resolution that is increased beyond the resolution limit of the imaging is produced from said data. Inter alia, a reassignment step is performed here. In this reassignment step, data of a plurality of pixels of the surface detector which are spaced apart in the first spatial direction are combined for each scanning position. In this way, a temporary data set comprising data of the respectively combined pixels is produced for each scanning position. Furthermore, an unmixing step is performed, in which the temporary data sets are corrected with respect to the spatial variation of the point spread function that is assigned to the respectively combined pixels. The correction is performed in a manner such that the same point spread function applies within each temporary data set for the location details present in the temporary data sets. The image of the sample is then produced from the temporary data sets and the scanning positions that are assigned thereto.

The reassignment step and the unmixing step permit the enlargement of the distances between the scanning positions at least in the first spatial direction during scanning. If a large overlap between adjacent scanning positions in each spatial direction was still necessary in the high-resolution microscopy method as described in the above-cited publications by Müller and Enderlein and EP 23173862 A1, this requirement is lowered at least in the first spatial direction due to the invention. As a result, a region of the sample to be captured is dealt with more quickly in the scanning process, with the result that the high-resolution microscopy method is accelerated. At the same time, the occurrence of artifacts is avoided due to the reassignment and unmixing steps.

The unmixing step and the generation of the image of the sample can be combined in a deconvolution operation. To this end, a system of equations is established and solved, for example. The system of equations links intensities of detection radiation via the spatially dependent point spread function to the signal intensities of the detector pixels. The detection radiation is emitted by locations of the sample.

For reassignment and unmixing, it is preferred in embodiments to determine an intensity of the detection radiation from the sample spot, which is incident on one of the detector pixels, by calculating a sum over a plurality of locations of the sample. For this, summands are added together. Each summand is the product of the spatially dependent point spread function with the intensity of the radiation coming from the respective location. That component of the spatially dependent point spread function which is assigned to the imaging of the respective location onto the corresponding detector pixel is taken as the basis here. Preferably, only a part of the locations which are adjacent in the first spatial direction are taken into consideration here. This part can be, for example, half. When generating the image, the spatially dependent point spread function is replaced by a spatially independent point spread function. By way of inverting this function, for each location the intensity of the radiation coming from it is calculated from the intensities of the detection radiation.

The illumination spot and consequently also the sample spot can also be diffraction-limited in a second spatial direction, which extends at an angle to the first spatial direction. The sample spot is then imaged into the image in a diffraction-limited fashion.

Alternatively, the illumination spot and consequently also the sample spot may not be diffraction-limited in the second spatial direction, which extends at an angle to the first spatial direction. When performing a scanning movement, sample spots overlap in adjacent scanning positions.

In the first spatial direction, sample spots in adjacent scanning positions preferably overlap by less than half the sample spot extent in the corresponding spatial direction.

It goes without saying that the aforementioned features and those yet to be explained below can be used not only in the combinations specified but also in other combinations or on their own, without departing from the scope of the present invention.

BRIEF DESCRIPTION OF THE DRAWINGS

The invention will be explained in more detail below on the basis of exemplary embodiments, with reference being made to the attached drawings, which likewise disclose features essential to the invention. These exemplary embodiments serve merely for illustration and should not be interpreted as restrictive. By way of example, a description of an exemplary embodiment with a multiplicity of elements or components should not be interpreted to the effect that all these elements or components are necessary for implementation purposes. Rather, other exemplary embodiments also may contain alternative elements and components, fewer elements or components or additional elements or components. Elements or components of different exemplary embodiments can be combined with one another, unless indicated otherwise. Modifications and developments which are described for one of the exemplary embodiments may also be applicable to other exemplary embodiments. In order to avoid repetition, the same elements or corresponding elements in the various figures are denoted by the same reference signs and are not explained a number of times. In the figures:

FIGS. 5A-C show depictions for explaining the effect of the image reconstruction, where FIG. 5A illustrates the original image;

FIG. 5B illustrates the re-assigned image; and

FIG. 5C illustrates the unmixed and deconvoluted image.

DETAILED DESCRIPTION OF EMBODIMENTS OF THE INVENTION

Figure 1:
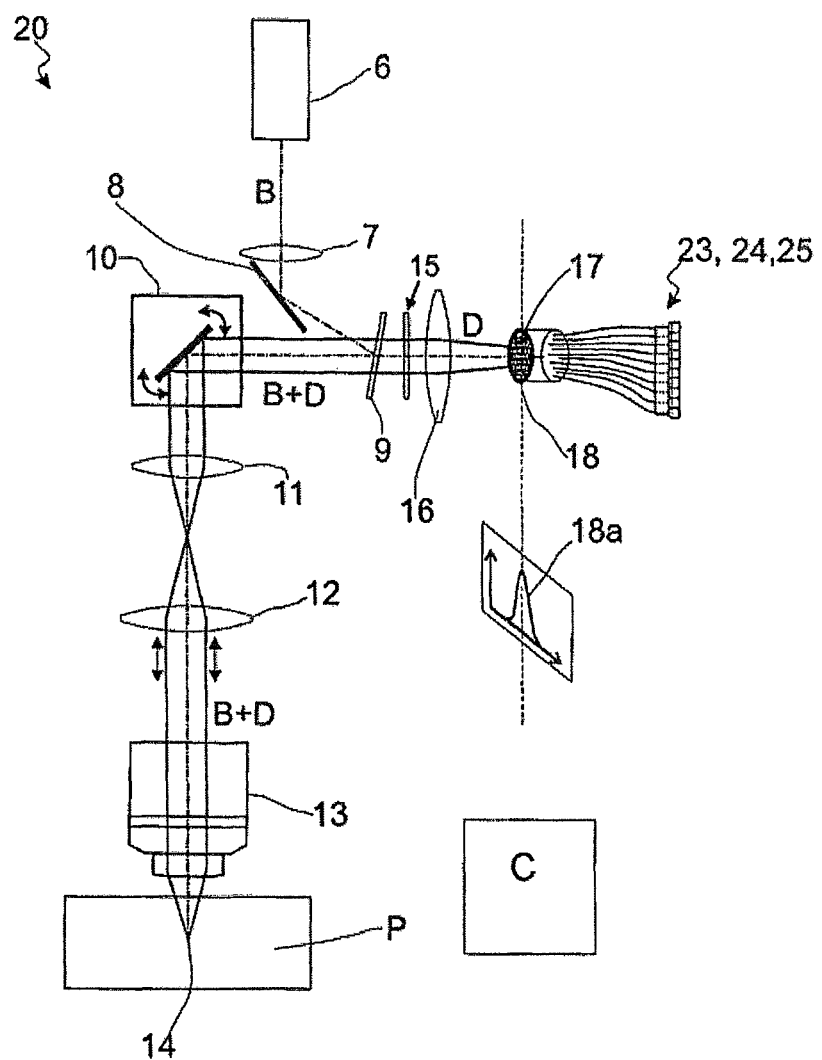
FIG. 1 is a schematic illustration of a laser scanning microscope for high-resolution microscopy.

FIG. 1 schematically illustrates a laser scanning microscope 20 configured for examining a sample P under a microscope. The laser scanning microscope (shortened to LSM below) 20 is controlled by a control device C and comprises an illumination beam path B and an imaging beam path D. The illumination beam path illuminates a spot in the sample P, and the imaging beam path D images said spot in a diffraction-limited fashion for detection. Illumination beam path B and imaging beam path D share a multiplicity of elements. This is not mandatory, however.

The sample P is illuminated in the LSM 20 using an illumination light beam provided by a light source 6, which beam is coupled to a mirror 8 via a deflection mirror 8, which is otherwise not functionally necessary, and a lens 7. The mirror 8 ensures that the light beam is incident on a main color splitter 9 at a reflection angle. For clarity, only the principal axis is drawn for the light beam.

After the light beam is reflected at the main color splitter 9, it is biaxially deflected by a scanner 10 and focused in a spot 14 in the sample P using lenses 11 and 12 through an objective 13. Here, the spot 14 in the illustration in FIG. 1 is line-shaped; however, a rotation-symmetrical spot is also possible. Fluorescence radiation excited in the spot 14 passes, via the objective 13, the lenses 11 and 12, back to the scanner 10, after which in the imaging direction a static light beam is present again. The latter passes through the main color splitter 9 and the emission filter 15, which have the function of selecting the fluorescence radiation in the spot 14 with respect to the wavelength thereof and in particular to separate it from the illumination radiation, which can serve for example as excitation radiation. A lens 16 ensures that, overall, the spot 14 is imaged in an image 17, which is located in a detection plane. The detection plane is a plane conjugate to the plane in which the spot 14 in the sample P is located. The image 17 of the spot 14 is recorded in the detection plane by a detector device 18, which includes elements 23-25 which are of no further relevance. What is essential here is that the detector device 18 spatially resolves the image 17 of the spot 14 in the detection plane. The intensity distribution of the spot with respect to the line direction (Gaussian distribution) is illustrated as 18a in FIG. 1. In embodiments, the spot 14 is imaged in diffraction-limited fashion. In the embodiment of FIG. 1, said spot is line-shaped. The illumination radiation is here expanded more along the line than would be permitted by the diffraction limit. Transversely to the line direction, the illumination spot is preferably diffraction-limited. In modified embodiments, an illumination spot and correspondingly a spot 14 on the sample P is imaged, which is greater in both directions than would be permitted by the diffraction limit. Nevertheless, the imaging into the image 17 is diffraction-limited, i.e., without additional expansion.

The illumination is based on a point spread function (PSF). Since in embodiments the illumination is used to excite fluorescence radiation, the point spread function is also referred to as excitation point spread function. An excitation point spread function which is also referred to as detection point spread function has an effect in the case of imaging into the image 17.

The control device C controls all components of the LSM 20, in particular scanner 10 and detector device 18. The control device C acquires for different scanning positions the data of each individual image 17, analyzes the diffraction structure thereof, and produces a high-resolution total image of the sample P.

The detector device 18 realizes a detector array having individual pixels that resolve the diffraction structure of the image 17. The use of a detector array has the advantage over the use of an individual detector, as is typical in conventional LSMs, that a very highly resolved image of the sample P is produced due to the possible small surface area of the pixels. In addition, the entire extent of the detector array permits collection of a great amount of detection light from the sample P, ensuring great light sensitivity. The LSM 20 can be sensitive and produce highly resolved images at the same time. These two requirements could not be satisfied at the same time using a conventional LSM with only one detector element. For imaging the sample, the latter is scanned in the manner of a grid in a scanning process by way of the scanner 10 correspondingly adjusting the position of the illumination spot and of the spot 14 on the sample P. By scanning the sample P, every pixel of the detector array 18 receives a complete image of the sample. The images generable based on the individual pixels differ from one another. Individual images are displaced with respect to one another on the basis of the position of the pixels relative to the sample P and relative to the excitation PSF. In addition, spatial frequencies of the sample with different amplitude and phase are transferred to the pixels.

Using the microscope described, an image of the sample P is generated by way of scanning using the entire detector array 18. The extent of the detector array 18 is here greater than a line distance in the image. For the purposes of acceleration, only every n-th line is scanned, and the image information from the lines which have not been scanned is generated from the signals of the individual pixels. As long as the line distance of the scanned lines is not greater than the extent of the detected region in the same dimension, a reconstruction of the image from the data of the pixels continues to be possible. The advantage is an image recording speed which is increased n times.

Figure 2:
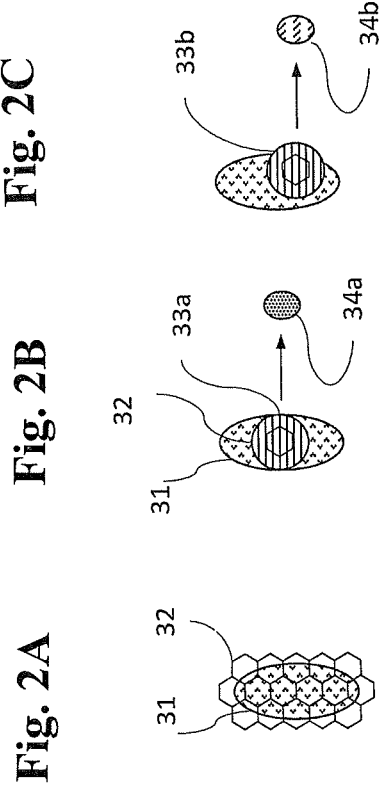
FIG. 2A is a depiction for illustrating PSF with a detector array having sixteen detector pixels.
FIG. 2B is another depiction for illustrating PSF in which a confocal PSF is shown.
FIG. 2C illustrates a confocal PSF of less intensity.

However, there are n line groups which can have different imaging properties. In concrete terms, n lines having respectively different imaging properties follow one another, and then this pattern repeats. Due to these periodically repeating imaging properties of the image lines, periodic artifacts in the form of stripes may arise. To understand the problem, FIGS. 2A to 2C are firstly to be examined. FIG. 2A shows the detector array 19 with a total of sixteen detector pixels 32. The illumination spot 31 is formed such that—mentally transferred into the detection plane—it covers the detector pixels 32. Owing to the imaging beam path, the signal of each detector pixel is influenced with the PSF of the imaging system in a manner such that, for example, a detection PSF 33a, as is shown in FIG. 2B, is obtained. The sample P is consequently scanned with a confocal PSF that can be understood mathematically as a product of the excitation and detection PSF in the spatial domain. Consequently, a confocal PSF 34a having a smaller extent than excitation and detection PSF is obtained. This property increases the resolution.

With a suitable calculation, it is possible to derive a highly resolved image from the individual images. To this end, locations and phases of the individual images are generally compensated, and these compensated images are combined. By weighting and adapting the spatial frequency amplitudes, it is thus possible to determine an image which corresponds as optimally as possible to the original sample P. The correction of the spatial frequency amplitudes and phases is referred to as deconvolution.

The shape and the intensity of the confocal PSF 34a is spatially dependent with respect to the locations in the sample and the detector pixels. It depends on the relative position between excitation and detection PSF. For example, the confocal PSF 34b shown in FIG. 2C for a detector pixel will have different properties than that in FIG. 2B, which applies to a different detector pixel. The reason is the different position of the detector pixel 32 and consequently the relative position of the detection PSF with respect to the excitation PSF. For example, the confocal PSF 34b from FIG. 2C will, for example, be less intensive because it is located in the peripheral region of the excitation PSF. The edge steepness of the PSF will likewise differ. As a consequence, an image scanned with this PSF 34b would also have a changed contrast and/or image sharpness than an image scanned with the PSF 34a. The differences between PSFs 34a, 34b are symbolized by different types of hatching.

FIGS. 3A and 3B once again illustrate the situation of scanning in the case of a group of lines having n lines. In concrete terms, four lines 36a are to be scanned at once. The detector array has sixteen pixels. Each detector pixel generates a line, having in each case its own confocal PSF 34a, 34b as indicated for two detector pixels. These sixteen lines are now to be combined to four lines. A first reconstruction step consists of assigning the detector lines to target lines 36a of the image. This assignment can be accomplished spatially such that target lines are always composed of the nearest source lines. Interpolation of the source lines to a plurality of target lines is likewise conceivable. The process of spatially assembling the target lines from the source lines is a reassignment.

The description below relates to four lines as an example. However, the method works with any desired number of lines, up to as many lines as detector pixels 32 are available.

It can be seen that each target line is made up of different source lines or of different portions of the source lines. However, since the source lines have different PSFs, the target lines also have different PSFs 37a. This is symbolized by way of the different type of hatching of the PSFs 37a.

As a consequence of these different PSFs, the image after rearrangement has a spatially varying PSF. As a consequence, image contents in the lines would be differently transferred, which would result in artifacts. The consequences thereof are represented in FIG. 5. Illustrated on the left is a Siemens star 70u. FIG. 5B shows the image of the star 70a as it looks after scanning and detector pixel reassignment. The peripheral regions with low spatial frequencies are reproduced without falsification. However, to the left and right of the center, clear artifacts in the form of Moiré patterns occur. They are a direct consequence of the periodically varying PSF, which is superposed on the periodic pattern of the star.

Figure 3:
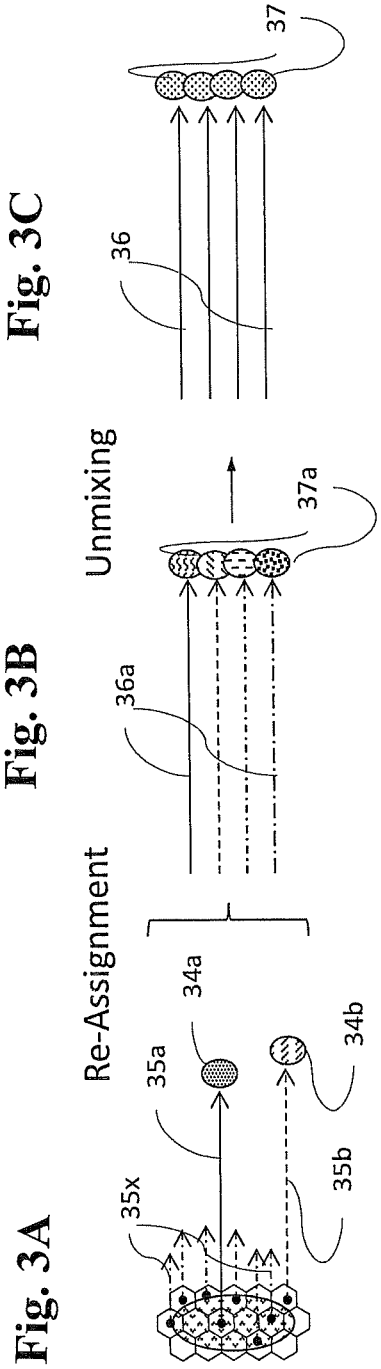
FIG. 3A shows a depiction for illustrating reassignment and unmixing steps during a line-type scan.
FIG. 3B shows four lines being scanned.
FIG. 3C illustrates the unmixing.

During processing, a homogeneous PSF is achieved, as is indicated in FIG. 3C. Here, all lines 36 have the same PSF 37. By scanning only every n-th line, a loss of information occurs which in the frequency domain of the image (which is linked to the spatial domain by way of a Fourier transform) is characterized by a superposition of spatial frequencies. This can be expressed in the form of an equation:

$$\hat{D}_h(k_x, k_y, k_z) = \frac{1}{n}\sum_{j=0}^{n-1}\left[O\left(k_x, k_y + \frac{j}{n}k_{y\,max}, k_z\right) \cdot S_h\left(k_x, k_y + \frac{j}{n}k_{y\,max}, k_z\right)\right],$$

$$k_y \leq \frac{k_{y\,max}}{n}$$

Here, $\hat{D}_h$ is the image of a detector pixel h, $k_x$, $k_y$, $k_z$ are the spatial frequency coordinates, n is the number of the simultaneously captured lines. O is the sample, $S_h$ is the confocal PSF of the detector pixel h (h is to be understood as the counting index). The equation shows that in the image of the detector pixel h, each $k_y$ is composed of n superposed components. At the same time, the spatial frequency spectrum only extends to $$\frac{k_{y\,max}}{n}.$$

The reassignment can be described in the frequency domain by multiplication with a phase $Sh_h$. The result for the composite image $\overset{...}{D}$ is then:

$$\overset{...}{D}_m(k_x, k_y, k_z) =$$

$$\sum_{j=0}^{n-1} \sum_{h=1}^{h_{max}} S_h\left(k_x, k_y + \frac{j}{n}k_{y\,max}, k_z\right) \cdot cc\left[Sh_h\left(k_x, k_y + \frac{m}{n}k_{y\,max}, k_z\right)\right] \cdot$$

$$O\left(k_x, k_y + \frac{j}{n}k_{y\,max}, k_z\right), k_y \le \frac{k_{y\,max}}{n}$$

The spectrum is for $$k_y \le \frac{k_{y\,max}}{n}.$$

In the image $\overset{...}{D}$, the higher frequencies are characterized by the index m. The sum over j describes the superposition of the spatial frequencies, h describes the sum over all detector pixels.

The terms including summation over h can be regarded as a matrix SF having n·n components:

$$SF_{m,j} = \sum_{h=1}^{h_{max}} S_h\left(k_x, k_y + \frac{j}{n}k_{y\,max}, k_z\right) \cdot cc\left[Sh_h\left(k_x, k_y + \frac{m}{n}k_{y\,max}, k_z\right)\right]$$

This matrix describes the convolution of the sample O with the PSF and also takes into account the crosstalk of the frequencies $$\frac{j}{n}k_{y\,max},$$

j=0 ... n−1.

The matrix is completely determinable from the microscope parameters. The confocal PSFs $S_h$ are given by the excitation and detection PSF of the optical system and are thus known. The phases $Sh_h$ required for the reassignment in turn depend only on the confocal PSF $S_h$ and are consequently also known. As a result, an inverse matrix $SF^{-1}$ is determined for SF. Using this matrix, the sample spectrum O is reconstructed from the components $\overset{...}{D}_m$ of the composite image. The matrix $SF^{-1}$ unmixes the superposed frequencies. The process is therefore an unmixing.

However, the multiplication of $\overset{...}{D}_m$ by $SF^{-1}$ would also multiply $\overset{...}{D}_m$ with the inverse PSF $S_h$. This inverse filtering may be problematic because it could considerably increase the noise components of $\overset{...}{D}_m$. As a countermeasure, it is optionally possible to calculate a modified matrix which describes only the crosstalk of the frequencies, but not the convolution with the confocal PSFs. To this end, the SF are divided by the confocal PSFs, which produces a "clean" crosstalk matrix:

$$F_{m,j} = \frac{\sum_{h=1}^{h_{max}} S_h\left(k_x, k_y + \frac{j}{n}k_{y\,max}, k_z\right) \cdot cc\left[Sh_h\left(k_x, k_y + \frac{m}{n}k_{y\,max}, k_z\right)\right]}{\sum_{h=1}^{h_{max}} S_h\left(k_x, k_y + \frac{j}{n}k_{y\,max}, k_z\right) \cdot cc\left[Sh_h\left(k_x, k_y + \frac{j}{n}k_{y\,max}, k_z\right)\right]}$$

F is undefined in frequency ranges in which the denominator tends to zero. However, this is not a problem because these frequency ranges are outside the transfer bandwidth, in other words beyond the resolution of the system. The calculation of the unmixed image $\overline{D}$ in matrix form is simply $$\overline{F^{-1}} \cdot \overset{...}{D} = \overline{D}$$

$\overline{D}$ can be supplied to a further deconvolution. The prior art for this is, for example, a filter of the type that is inspired by a Wiener filter and provides a deconvoluted image $\tilde{O}$:

$$\tilde{O}(k_x, k_y, k_z) = \frac{\overline{D} \cdot cc[SSh(k_x, k_y, k_z)]}{|SSh(k_x, k_y, k_z)|^2 + w}$$

Here, SSh is the effective PSF of the unmixed image $\overset{...}{D}$.

FIG. 5C illustrates the unmixed and deconvoluted image 70, as it is produced by unmixing from the assigned image 70a. It practically corresponds to the original image 70u, and the Moiré effects are compensated.

The following general statements are possible:

The phase factors $Sh_h$ used for the composite image can be obtained with different approaches. A simple approach is the already mentioned spatial reassignment, which results in linear phase factors. In this way, an image is obtained which is already close to the unmixed image in the case of a PSF which is not too inhomogeneous. A further possibility is the use of the phase of the PSF $S_h$ as phase factors. In this way, an image is obtained in which all frequency components interfere constructively. It is thus optimized with respect to the signal components and consequently also the signal to noise ratio. However, the composite image is then even more subject to artifacts, and it is not very suitable for being used as a preview image, for example. An artifact-free image is obtained only after the step of unmixing. Other phase factors are possible.

The above explanation describes the unmixing and deconvolution as sequential steps. However, the calculation of the unmixed/deconvoluted image is also possible in fewer or even only one step without taking a detour via the composite image. To this end, the system of equations is established directly with the individual images of the detector pixels $\hat{D}_h$:

$$\hat{D}_0 = S_{0,0} \cdot O + \quad \ldots \quad + S_{0,n-1} \cdot O_{n-1}$$
$$\vdots \qquad \qquad \ddots \qquad \vdots$$
$$\hat{D}_{h\,max} = S_{h\,max,0} \cdot O + \quad \ldots \quad S_{h\,max,n-1} \cdot O_{n-1}$$

The crosstalk and convolution matrix composed of the confocal PSFs now has $h_{max}$ lines and n columns. The inversion of the system for calculating O from all $\hat{D}_h$ is overdetermined. It is likewise necessary to take measures in order to avoid, as described above, inverse filtering with diverging components. Similar to the above procedure, even then a usable approximate solution is obtained.

Another modification is that the subsampling is practiced not only in one spatial direction, but in a different or a plurality of spatial directions at the same time. In this case, the calculation is correspondingly extended, without being changed in principle. At any rate, superposed spatial frequency components are obtained, which can be unmixed to reconstruct the original image.

Figure 4:
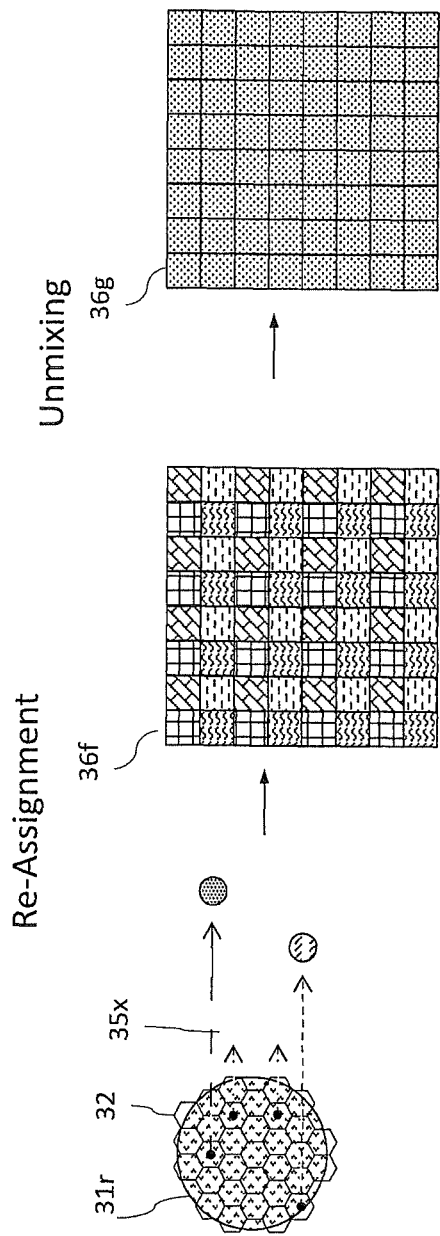
FIG. 4 shows a depiction similar to FIG. 3 for a spot-shaped scan.

FIG. 4 shows by way of example double underscanning in the x-direction and y-direction. The excitation PSF 31*r* in this case is round, as is the case for conventional scanning. The confocal PSFs are assembled into an image 36*f* per reassignment and subsequently unmixed, which produces an image with a homogeneous PSF 36*g*.

By scanning only every second line, a frame rate which is only two times higher is obtained. Omitting every other pixel in x does not cause an increase in the image recording speed unless the frame rate is limited by the data transmission speed. On the other hand, no modified excitation PSF is necessary for this method, but it is possible to use the excitation PSF as is already typically available in a high-resolution microscope. That is to say, the acceleration of the recording time can be achieved purely by changing the image recording control and the computation, without any further change in terms of hardware being necessary. It is thus possible to achieve the acceleration only by adapting the software of an existing LSM 20.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method for high-resolution scanning microscopy of a sample, comprising the steps of:
   a) focusing illumination radiation into an illumination spot in or on the sample and stimulating the emission of detection radiation to a sample spot which coincides with the illumination spot, wherein the illumination spot and consequently also the sample spot are not diffraction-limited in at least one first spatial direction,
   b) optically imaging the sample spot into an image that is static on a spatially resolving surface detector comprising pixels of a size that spatially resolve the image, wherein the optical imaging has an optical imaging resolution limit and a point spread function which varies locally for the pixels,
   c) performing a scanning movement of the illumination spot and of the coinciding sample spot over the sample in a scanning operation, wherein lines extend along the first spatial direction and a distance between adjacent lines corresponds to the extent of the sample spot in the first spatial direction,
   d) reading data of the pixels of the surface detection during the scanning operation for each scanning position,
   e) generating an image of the sample having a resolution that is increased beyond the optical imaging resolution limit of the imaging, wherein
      e1) a reassignment step is performed, in which, for each scanning position, data of a plurality of pixels of the surface detector, which are spaced apart in the first spatial direction, are combined to generate, for each scanning position, a temporary data set comprising data of combined pixels,
      e2) an unmixing step is performed, in which the temporary data sets are corrected with respect to the spatial variation of the point spread function that is assigned to the respectively combined pixels such that the same point spread function applies within each temporary data set,
      e3) the image of the sample is generated from the thus processed data of the pixels and the scanning positions assigned thereto.

2. The method as claimed in claim 1, wherein steps e2) and e3) are combined in a deconvolution operation, wherein a system of equations is established and solved, which links intensities of detection radiation, emitted from locations of the sample, via the spatially dependent point spread function to the signal intensities of the pixels.

3. The method as claimed in claim 1, wherein step e2) is performed such that the same point spread function applies to all temporary data sets.

4. The method as claimed in claim 1, wherein
   an intensity of the detection radiation from the sample spot, which is incident on one of the pixels, is determined by calculating a sum over a plurality of locations, wherein the summands are in each case the product of the spatially dependent point spread function, with which the respective location is imaged onto this one of the pixels, with the intensity of the radiation coming from the respective location, and
   when generating the image of the sample, the spatially dependent point spread function is replaced by a spatially independent point spread function, and, by inverting the spatially independent point spread function, the intensity of the radiation coming therefrom is calculated for each location from the intensities.

5. The method as claimed in claim 4, wherein, when calculating the sum, only some of the locations which are adjacent in the first spatial direction are taken into account.

6. The method as claimed in claim 4, wherein
   the illumination spot and consequently also the sample spot are diffraction-limited in a second spatial direction, which extends at an angle to the first spatial direction, and
   the sample spot is imaged into the image in a diffraction-limited fashion.

7. The method as claimed in claim 4, wherein
   the illumination spot and consequently also the sample spot are likewise not diffraction-limited in a second spatial direction, which extends at an angle to the first spatial direction,
   the sample spot is imaged into the image in a diffraction-limited fashion, and
   during the scanning movement in step c) sample spots overlap in adjacent scanning positions.

8. The method as claimed in claim 1, wherein during the scanning movement in step c), in adjacent scanning positions, the sample spots on the sample overlap in the first spatial direction by less than half the sample spot extent in this spatial direction.

* * * * *

UNITED STATES PATENT AND TRADEMARK OFFICE
CERTIFICATE OF CORRECTION

PATENT NO. : 10,746,657 B2
APPLICATION NO. : 16/289892
DATED : August 18, 2020
INVENTOR(S) : Wolfgang Bathe Page 1 of 1

It is certified that error appears in the above-identified patent and that said Letters Patent is hereby corrected as shown below:

On the Title Page

Foreign Application Priority Data
now reads: "Mar. 1, 2018 (DE) ................02018104693.6"
should read -- Mar. 1, 2018 (DE) ............102018104693.6 --

Abstract, Line 8
now reads: "spatially resolve the image, wherein the imaging has a an"
should read -- spatially resolve the image, wherein the imaging has an --

In the Specification

Column 7, Line 47
now reads: "$\frac{j}{n} k_{y\,max}$, $j = 0 \ldots n - 1$"
should read -- $\frac{j}{n} k_{y\,max}, j = 0 \ldots n - 1$ --

Column 8, Lines 5-13
now reads: "
$$F_{m,j} = \frac{\sum_{h=1}^{h_{max}} S_h\left(k_x, k_y + \frac{j}{n} k_{y\,max}, k_z\right) \cdot cc\left[Sh_h\left(k_x, k_y + \frac{m}{n} k_{y\,max}, k_z\right)\right]}{\sum_{h=1}^{h_{max}} S_h\left(k_x, k_y + \frac{j}{n} k_{y\,max}, k_z\right) \cdot cc\left[Sh_h\left(k_x, k_y + \frac{j}{n} k_{y\,max}, k_z\right)\right]}$$
"
should read --
$$F_{m,j} = \frac{\sum_{h=1}^{h_{max}} S_h\left(k_x, k_y + \frac{j}{n} k_{y\,max}, k_z\right) \cdot cc\left[Sh_h\left(k_x, k_y + \frac{m}{n} k_{y\,max}, k_z\right)\right]}{\sum_{h=1}^{h_{max}} S_h\left(k_x, k_y + \frac{j}{n} k_{y\,max}, k_z\right) \cdot cc\left[Sh_h\left(k_x, k_y + \frac{j}{n} k_{y\,max}, k_z\right)\right]}$$
--

Column 8, Line 21
now reads: "$\overline{F}^{-1} \cdot \ddot{\overline{D}} = \overline{\overline{D}}$"
should read -- $\overline{F}^{-1} \cdot \ddot{\overline{D}} = \overline{D}$ --

Signed and Sealed this
Twentieth Day of October, 2020

Andrei Iancu
*Director of the United States Patent and Trademark Office*